United States Patent Office 3,527,429
Patented Sept. 8, 1970

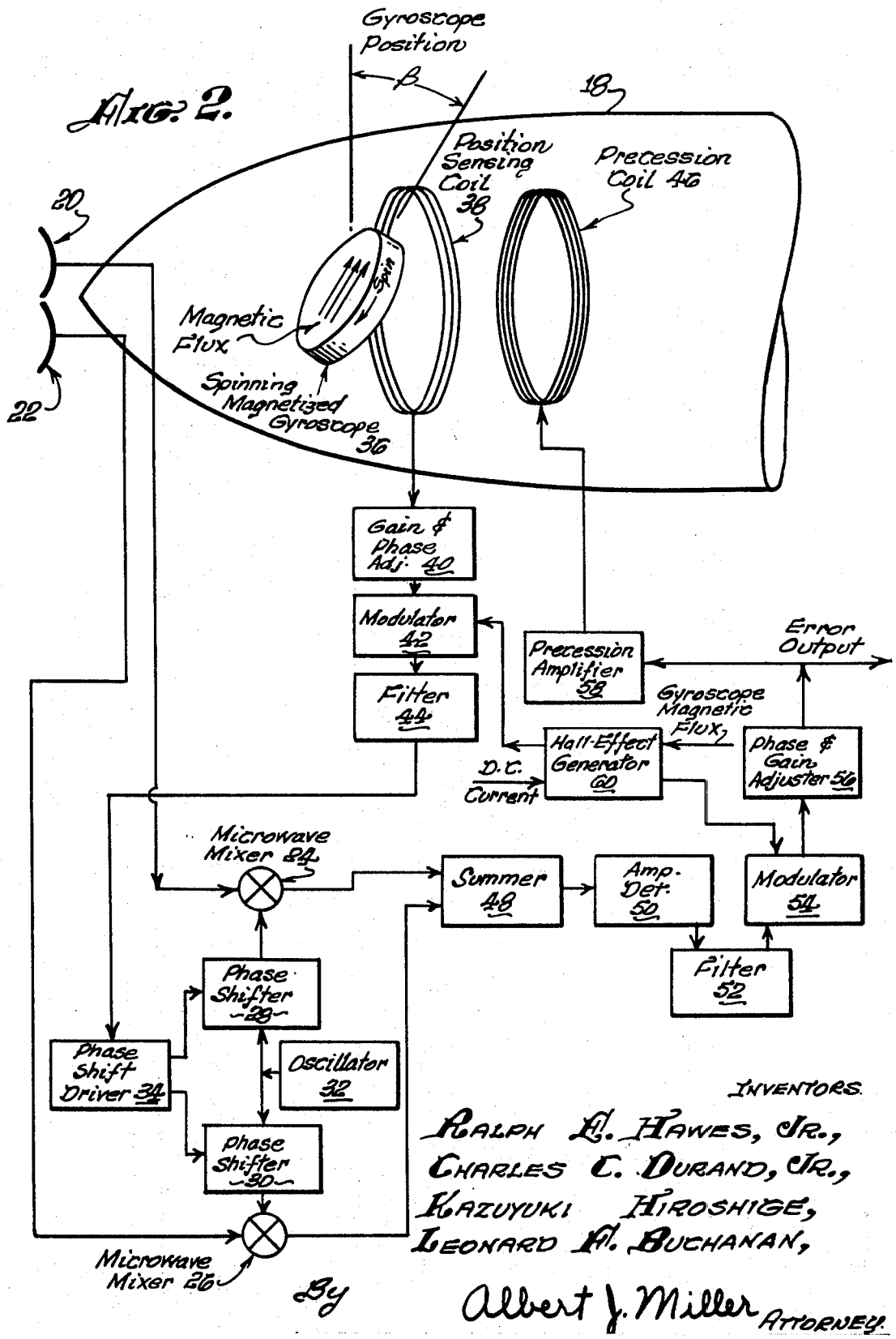

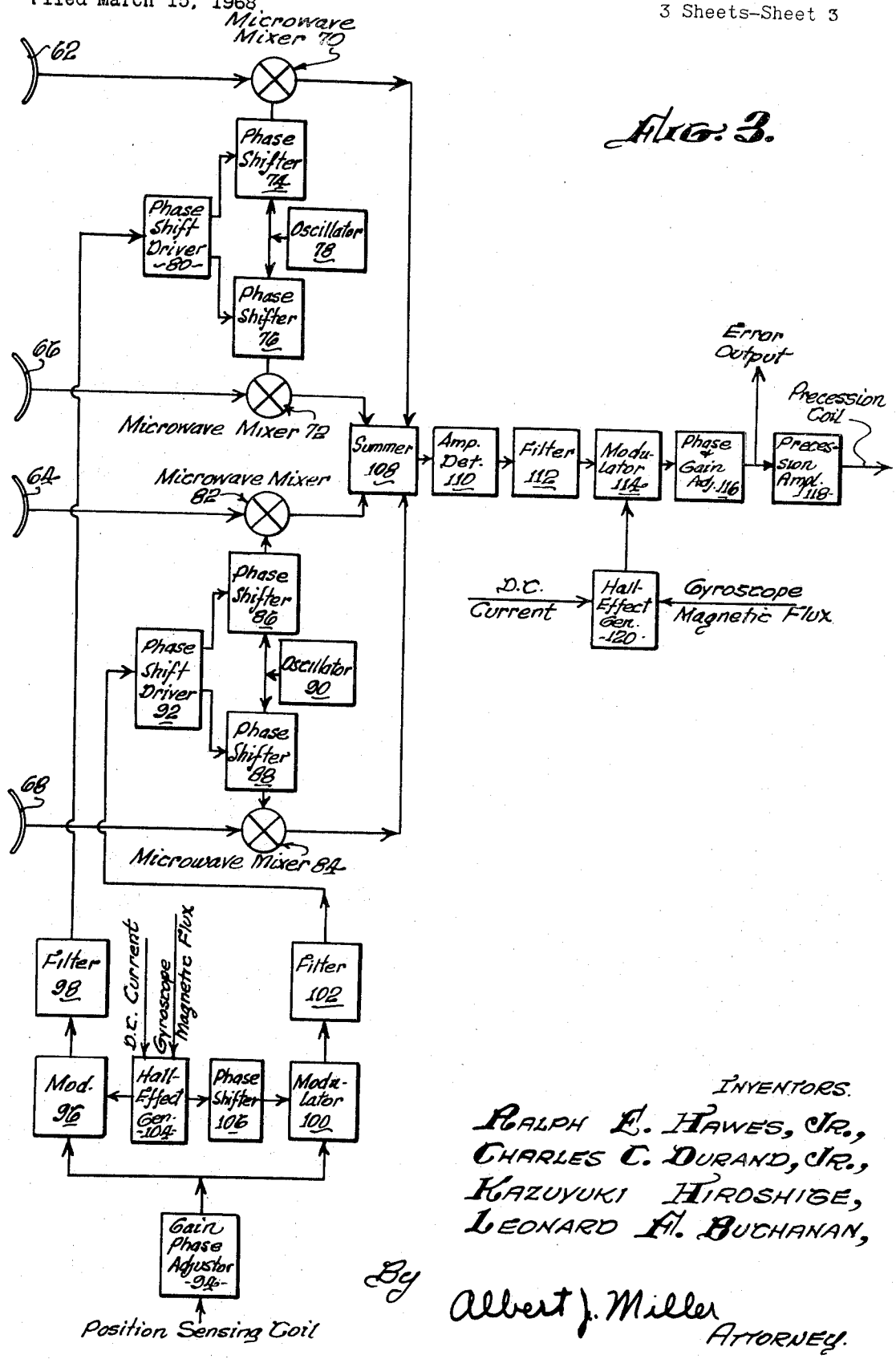

3,527,429
BODY MOTION DECOUPLER
Ralph E. Hawes, Jr., Claremont, Charles C. Durand, Jr., Upland, Kazuyuki Hiroshige, Glendora, and Leonard Buchanan, Pomona, Calif., assignors to General Dynamics Corporation, a corporation of Delaware
Filed Mar. 15, 1968, Ser. No. 713,483
Int. Cl. F41g 7/18, 9/00, 11/00
U.S. Cl. 244—3.14                    10 Claims

ABSTRACT OF THE DISCLOSURE

A body motion decoupler for a vehicle having a body fixed receptor to receive energy reflected from a target. The vehicle body motion sensed by the receptor is cancelled by relating it to a space stable reference.

BACKGROUND OF THE INVENTION

In a typical proportional navigation guidance scheme for a vehicle such as an air missile, the magnitude and direction of the missile to target line of sight rate of change is normally measured by a receptor and this output is used to control the rate of change of the missile velocity in both magnitude and direction. The primary measurement performed by this receptor or antenna is the angle between the missile to target line of sight and the antenna electrical boresight.

When, however, the receptor is rigidly attached to the missile airframe, the angle sensed by the receptor leads to an output which is proportional not only to the desired missile to target line of sight rate of change but also to the missile body turning rate. If this signal, which includes information proportional to the missile body turning rate, is fed to the missile control system, a closed loop is created. This loop, commonly referred to as a body coupling loop is normally undesirable in that it will adversely affect the stability and guidance accuracy of the missile.

SUMMARY OF THE INVENTION

A spinning magnetized gyroscope which induces an EMF in an inductor is utilized as a space stable reference to decouple body motion sensed by fixed receptors mounted on a guided vehicle body. Signal processing circuitry operates upon the receptor signals and the induced EMF to produce an error signal which in turn activates a precession coil around the gyroscope to torque the gyroscope so as to eliminate the sensed body motion.

Therefore, it is an object of this invention to provide a body motion decoupler for a guided vehicle having body fixed receptors to receive energy reflected from a target.

BRIEF DESCRIPTION OF THE DRAWINGS

FIG. 2 is a schematic diagram of the body motion decoupler of the present invention as applied to a rolling missile.

FIG. 3 is a schematic diagram of the body motion decoupler of the present invention as applied to a non-rolling missile.

DESCRIPTION OF THE PREFERRED EMBODIMENTS

Figure 1:
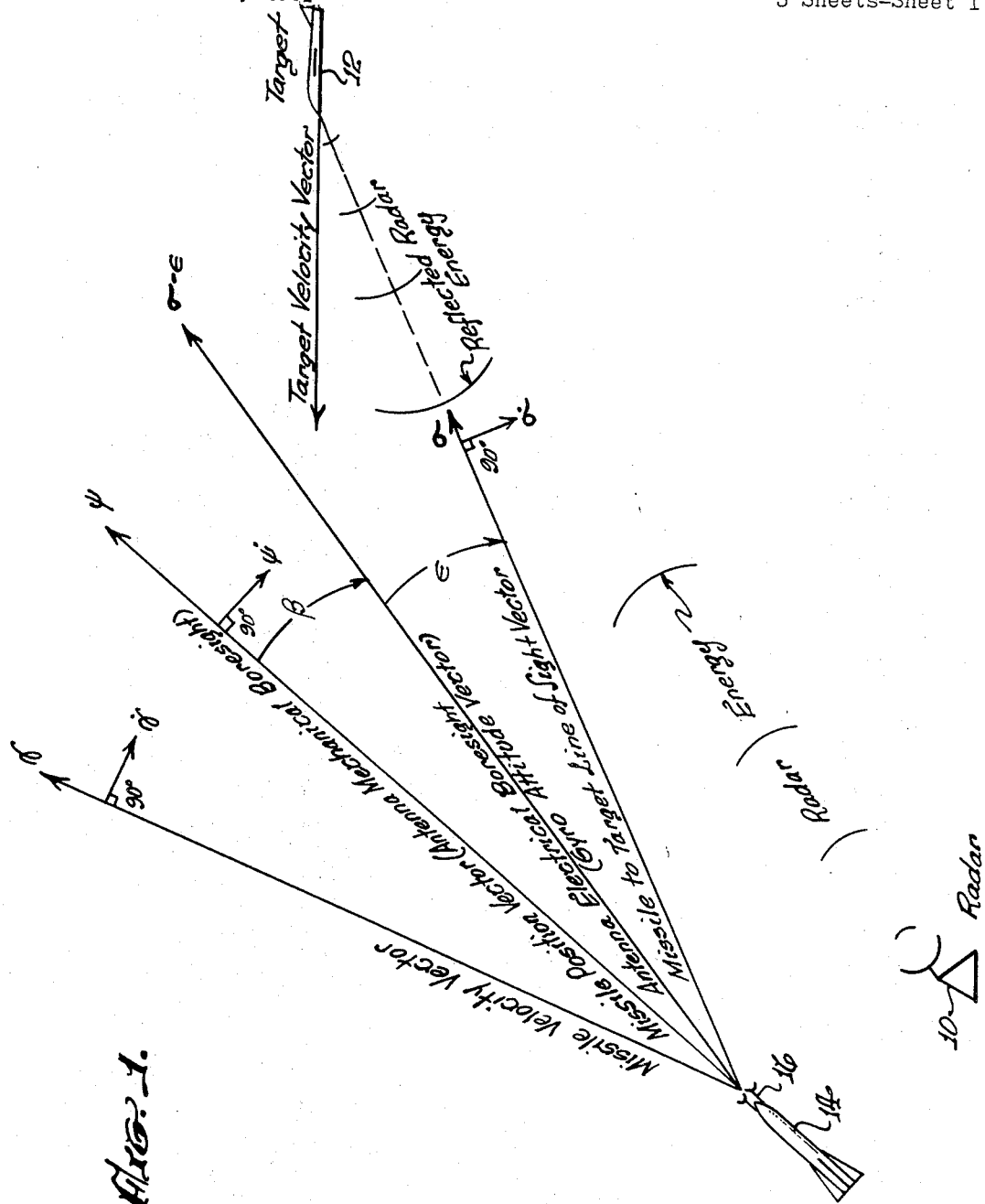
FIG. 1 is a geometric vector representation of a proportional navigation guidance scheme.

The present invention is an integral part of a proportional navigation guidance system for a vehicle such as an air missile. A single plane vector representation of such a system is illustrated in FIG. 1.

A radar 10, or other source of electromagnetic energy capable of being reflected from a target, transmits such energy to a target 12 moving in the direction of the target velocity vector. This energy is reflected from the target 12 to the missile 14 having receptors 16 along the missile to target line of sight vector $\sigma$. The missile antenna electrical boresight (gyroscope attitude vector) is displaced an angle $\epsilon$ from the missile to target line of sight vector $\sigma$ and is represented by $\sigma - \epsilon$. An angle $\beta$ displaces the missile position vector (antenna mechanical boresight) $\psi$ from the antenna electrical boresight. The missile velocity vector $\gamma$ is displaced a still further angle from the missile position vector. The vectors $\dot{\sigma}$, $\dot{\psi}$, and $\dot{\gamma}$ represent rate of change vectors for $\sigma$, $\psi$, and $\gamma$ respectively and are at a 90° angle from said vectors.

The magnitude and direction of the missile velocity rate of change $\dot{\gamma}$ are controlled by the output of a system which measures the magnitude and direction of the missile to target line of sight rate of change $\dot{\sigma}$. The primary measurement of the missile receptors 16 is the angle $\epsilon$ between the missile to target line of sight $\sigma$ and the antenna electrical boresight $\sigma - \epsilon$. In a closed loop angle tracking system, where the receptors 16 are rigidly affixed to the missile 14, the angle $\epsilon$ sensed by the receptors is proportional to $\dot{\sigma} - \dot{\psi}$, where $\dot{\psi}$ is the missile body turning rate. As previously indicated, if the signal fed to the missile control system contains information proportional to body motion, a body coupling loop will result.

The body motion decoupler of the present invention is applicable to both rolling and non-rolling vehicles. A schematic illustration of its application to a rolling missile is contained in FIG. 2.

The missile body 18 has a pair of receptors 20 and 22 such as surface wave antennas rigidly mounted at the front end thereof. These antennas 20 and 22 may be circularly polarized polyrods of a material such as slip-cast fused silica. The separate outputs from antennas 20 and 22 are fed directly to microwave mixers 24 and 26 respectively. Separate phase shifters 28 and 30 fed by an oscillator 32 and by a phase shift driver or amplifier 34 are coupled with microwave mixers 24 and 26 respectively which in turn both feed into a summing network or summer 48. Microwave mixers 24, 26 may be the strip line type and contain a crystal diode.

Mounted within the missile body 18 is a space stable reference platform such as a spinning magnetized free gyroscope or inertial mass 36. An inductor or gyroscope position sensing coil 38 is provided around the magnetized gyroscope 36. The angle between the plane of the magnetized gyroscope 36 and inductor 38 is identified as $\beta$. The electromotive force (EMF) generated in the inductor 38 is serially fed to the phase shift driver 34 through a gain and phase adjustor 40, modulator 42, and filter 44.

A precession coil 46 is also provided around the spinning gyroscope 36. This coil 46 is serially connected to the summer 48 through an amplitude detector 50, filter 52, modulator 54, phase and gain adjustor 56, and precession amplifier 58. The precession amplifier 58 may not be necessary if the output signal from the phase and gain adjustor 56 is strong enough. An error output is taken from the phase and gain adjustor 56, and fed to the missile control system (not shown). A Hall-effect generator device 60, fed by a D.C. current and the gyroscope magnetic flux is coupled to both modulators 42 and 54 to vary the outputs of the modulators in accordance with the strength of the flux. As is known in the art, a Hall generator is a generator using the Hall effect to give an output voltage proportional to magnetic field strength. The Hall generator usually consists of a thin wafer of semiconductor material mounted within a magnetic field and with a source of current connected to the semiconductor. Its output voltage is proportional to the current passing through it times the magnetic field perpendicular to it.

In operation, the antennas 20 and 22 receive the (radar) energy reflected from the target 12. The target angle data $\sigma - \psi$ is derived from the phase difference of the target signals at the antennas. The antenna outputs differing in phase by an amount proportional to $\sigma - \psi$, are fed directly to the microwave mixers 24 and 26, where they are appropriately phase shifted by the outputs from phase shifters 28 and 30 in the phase shift network to provide a closed loop difference pattern null tracking of the target 12 such that the antenna array is, in effect, electronically slewed toward the target to maintain a steady target signal throughout the missile roll cycle. The oscillator 32 such as a solid state local oscillator (SSLO) converts the frequency of the antenna output, after the phase shifting to an intermediate frequency before summation in the summer 48. The summer 48 inherently converts phase difference (between the two inputs) to amplitude modulation at the output.

The spinning magnetized free gyroscope or inertial mass 36 in the missile body 18 has lines of magnetic flux perpendicular to its spin axis as shown in FIG. 2. The rotation of the gyroscope 36 will induce an electromotive force in the coil 38 which is indicative of the gyroscope position relative to the coil 38 or missile body 18. The angle between the gyro 36 and coil 38 identified as $\beta$ is the same as the angle between the missile position vector and gyroscope attitude vector of FIG. 1. The gyroscope 36, being spaced stabilized, produces an immediate change in induced EMF in the coil 38 proportional to any missile body motion $\dot{\psi}$ which occurs.

This induced EMF is fed into the circuitry of FIG. 2 as indicated and utilized, together with the antenna outputs, to precess the magnetized gyroscope 36 by inducing a field in the precession coil 46. By properly providing near-unity gain between the inductor 38 and the phase shifters 28 and 30, any body motion sensed by the fixed body antennas 20 and 22 can be cancelled by the body motion sensed by the inductor 38 from the magnetized gyroscope 36. The error output from the phase and gain adjustor 56 will therefore be proportional only to the missile to target line of sight rate of change $\dot{\sigma}$.

A non-rolling missile application of the body motion decoupler is illustrated in FIG. 3. Basically this adaptation is effected simply by the duplication of certain elements of the rolling missile system of FIG. 2.

Four antennas 62, 64, 66 and 68 are mounted at 90° intervals around the front periphery of the missile body and are grouped into two separate antenna pairs. The pairs (62 and 66) and (64 and 68) are formed by the diametrically opposed antennas. The first pair of antennas (62 and 66) are coupled to microwave mixers 70 and 72 respectively. Separate phase shifters 74 and 76, fed by an oscillator 78 and phase shift driver or amplifier 80 in a phase shift network are coupled with the microwave mixers 70 and 72 respectively. Likewise, the microwave mixers 82 and 84 coupled to antennas 64 and 68 respectively, are coupled to separate phase shifters 86 and 88 respectively which are in turn fed by oscillator 90 and phase shift driver or amplifier 92 in a phase shift network. Microwave mixers 70, 72, 82, 84 may be the strip line type and contain a crystal diode.

The inductor EMF from the position sensing coil of the spinning magnetized free gyroscope is fed to a gain and phase adjustor 94 and then split into two channels. The first channel comprises a modulator 96 and filter 98 which is coupled to phase shift driver 80 whereas the second channel comprises a modulator 100 and filter 102 which is coupled to phase shift driver 92. A Hall-effect generator device 104 fed by a D.C. current and the gyroscope magnetic flux is coupled directly to modulator 96 and to modulator 100 through a phase shifter 106 in the phase shift network to vary the outputs of the modulators in accordance with the strength of the gyroscope flux.

A summing network or summer 108 receives the output from the mixers 70, 72, 82, and 84 and from here the circuit is identical to FIG. 2, i.e., comprises an amplitude detector 110, filter 112, modulator 114, phase and gain adjustor 116, and precession amplifier 118. The Hall-effect generator device 120 which feeds and varies the output of the modulator 114 may be common with the Hall-effect generator device 104 which feeds modulators 96 and 100.

Operation of the non-rolling missile configuration is substantially identical to the rolling missile configuration of FIG. 2.

In addition to the body motion decoupling as described above, the system has the advantage of being readily adaptable to a dual mode of operation, i.e., having a seeker responsive to more than one wavelength of radiation. It is readily apparent that the gyroscope 36 will be maintained in a direction pointing toward the target from which the energy is picked up by the receptor. Accordingly, the receptor for a second mode seeker such as a sound wave transducer can be mounted directly to the spinning gyroscope and can respond with its own error signal upon achieving a sufficient level of energy.

Other advantages include the relative simplicity of the hardware required for implementation, the applicability to both rolling and non-rolling air frames, and the fact that body motion can be sensed not strictly about the missile pitch and yaw axes but normal to the line of sight axis. The system is in fact applicable to any vehicle (missile, spacecraft, underwater craft, etc.) which utilizes received energy for guidance and has body fixed receptors.

What is claimed is:
1. A body motion decoupler for a vehicle comprising:
 (a) receptor means fixedly mounted upon the body of the vehicle to receive energy from a prospective target and produce an output signal;
 (b) gyroscope means mounted within the body of the vehicle and having a rotating magnetized gyroscope and a portion sensing coil to generate a signal indicating the position of the gyroscope with respect to the sensing coil and the vehicle body turning rate;
 (c) signal processing means operably associated with said receptor means and said gyroscope means to receive the output signal from said receptor means and the signal generated by the sensing coil of said gyroscope means to produce an error output signal and a precession signal; and
 (d) gyroscope precession means operably associated with said gyroscope means and said signal processing means to receive the precession signal from said signal processing means and precess the rotating magnetized gyroscope of said gyroscope means into alignment with the prospective target.

2. The body motion decoupler of claim 1 wherein (a) said receptor means comprises a pair of antennas mounted on the body of the missile to sense the missile to prospective target line of sight and missile body turning rate and produce an output signal therefrom and (b) said gyroscope precession means comprises a precession coil which receives the precession signal from said signal processing means and precesses the rotating magnetized gyroscope into alignment with the prospective vehicle target and eliminates the body turning rate portion of the receptor output signal from the error output signal of said signal precessing means.

3. The body motion decoupler of claim 1 wherein: (a) said receptor means comprises a first pair of antennas mounted on the body of the missile to sense the missile to prospective target line of sight and missile body turning rate and produce a first output signal therefrom and a second pair of antennas mounted on the body of the missile to sense the missile to prospective target line of sight and missile body turning rate and produce a second output signal therefrom differing in phase from said first output signal; (b) said signal processing means being operably associated with both said first and said second pairs of antennas and said gyroscope means to receive both said first and said second output signals and the signal generated by the sensing coil of said gyroscope means to produce an error output signal and a precession signal; and
(c) said gyroscope precession means comprises a precession coil which receives the precession signal from said signal processing means and precesses the rotating magnetized gyroscope into alignment with the prospective target and eliminates the body turning rate portion of the first and second antennas output signals from the error output signal of said signal processing means.

4. The body motion decoupler of claim 1 wherein said signal processing means includes:
  (a) microwave mixer means operably connected to said receptor means to receive said output signal from said receptor means;
  (b) phase shift network means operably connected to said microwave mixer means to shift the phase of said output signal in said microwave mixer means;
  (c) first circuit means operably connected to said phase shift network means and to said position sensing coil for processing and coupling a signal from said gyroscope means to said phase shift network means indicative of the position of said gyroscope means;
  (d) a summing network responsive to said mixer means;
  (e) second circuit means responsive to the output of said summing network for providing said precession signal to said gyroscope precession means to precess said rotating magnetized gyroscope and for providing said error output signal to said vehicle; and
  (f) generator means operably connected to said first circuit means and to said second circuit means to vary the signal outputs of said first and second circuit means in accordance with flux changes of said rotating magnetized gyroscope.

5. The body motion decoupler of claim 4 wherein said phase shift network means includes:
  (a) a phase shift driver operably connected to the output of said first circuit means;
  (b) a plurality of phase shifters operably connected to an input of said microwave mixer means and to the output of said phase shift driver, said phase shifters being responsive to said phase shift driver; and
  (c) an oscillator operably coupled to said phase shifters.

6. The body motion decoupler of claim 4 wherein said first circuit means includes:
  (a) a signal gain and phase adjustor operably connect to said position sensing coil;
  (b) a modulator operably connected to said signal gain and phase adjustor and responsive thereto; and
  (c) a filter operably connected to said modulator to couple said signal from said gyroscope means to said phase shift network means.

7. The body motion decoupler of claim 4 wherein said generator means is a Hall-effect generator.

8. The body motion decoupler of claim 3 wherein said signal processing means includes:
  (a) first microwave mixer means operably connected to said first pair of antennas to receive said first output signal;
  (b) first phase shift network means operably connected to said first microwave mixer means to shift the phase of said first output signal;
  (c) second microwave mixer means operably connected to said second pair of antennas to receive said second output signal;
  (d) second phase shift network means operably connected to said second microwave mixer means to shift the phase of said second output signal;
  (e) first circuit means operably connected to said first and second phase shift network means and to said position sensing coil for processing and coupling a signal from said gyroscope means to said first and second phase shift network means indicative of the position of said rotating magnetized gyroscope;
  (f) a summing network responsive to said first and second microwave mixer means;
  (g) second circuit means responsive to the output of said summing network for providing said precession signal to said gyroscope precession means to precess said rotating magnetized gyroscope and for providing said error output signal to said vehicle; and
  (h) generator means operably connected to said first and second circuit means to vary the signal outputs of said first and second circuit means in accordance with flux changes of said rotating magnetized gyroscope.

9. The body motion decoupler of claim 8 wherein said first circuit means includes:
  (a) a signal gain and phase adjustor operably connected to said position sensing coil;
  (b) a first modulator operably connected to said signal gain and phase adjustor and responsive thereto;
  (c) a second modulator operably connected to said signal gain and phase adjustor and responsive thereto;
  (d) a phase shifter operably connected to said second modulator;
  (e) said generator means operably connected to said first modulator and to said phase shifter to vary the signal outputs of said first and second modulators;
  (f) a first filter operably connected to said first modulator to couple said signal from said gyroscope means to said first shift network means; and
  (g) a second filter operably connected to said second modulator to couple said signal from said gyroscope means to said second phase shift network means.

10. The body motion decoupler of claim 8 wherein said generator means is a Hall-effect generator.

References Cited

UNITED STATES PATENTS

| | | | |
|---|---|---|---|
| 3,311,326 | 3/1967 | Scotto et al. | 244—3.2 |
| 3,363,858 | 1/1968 | Dobbins et al. | 244—3.14 |
| 3,405,888 | 10/1968 | Okamoto | 244—3.14 |

BENJAMIN A. BORCHELT, Primary Examiner

T. H. WEBB, Assistant Examiner